UNITED STATES PATENT OFFICE.

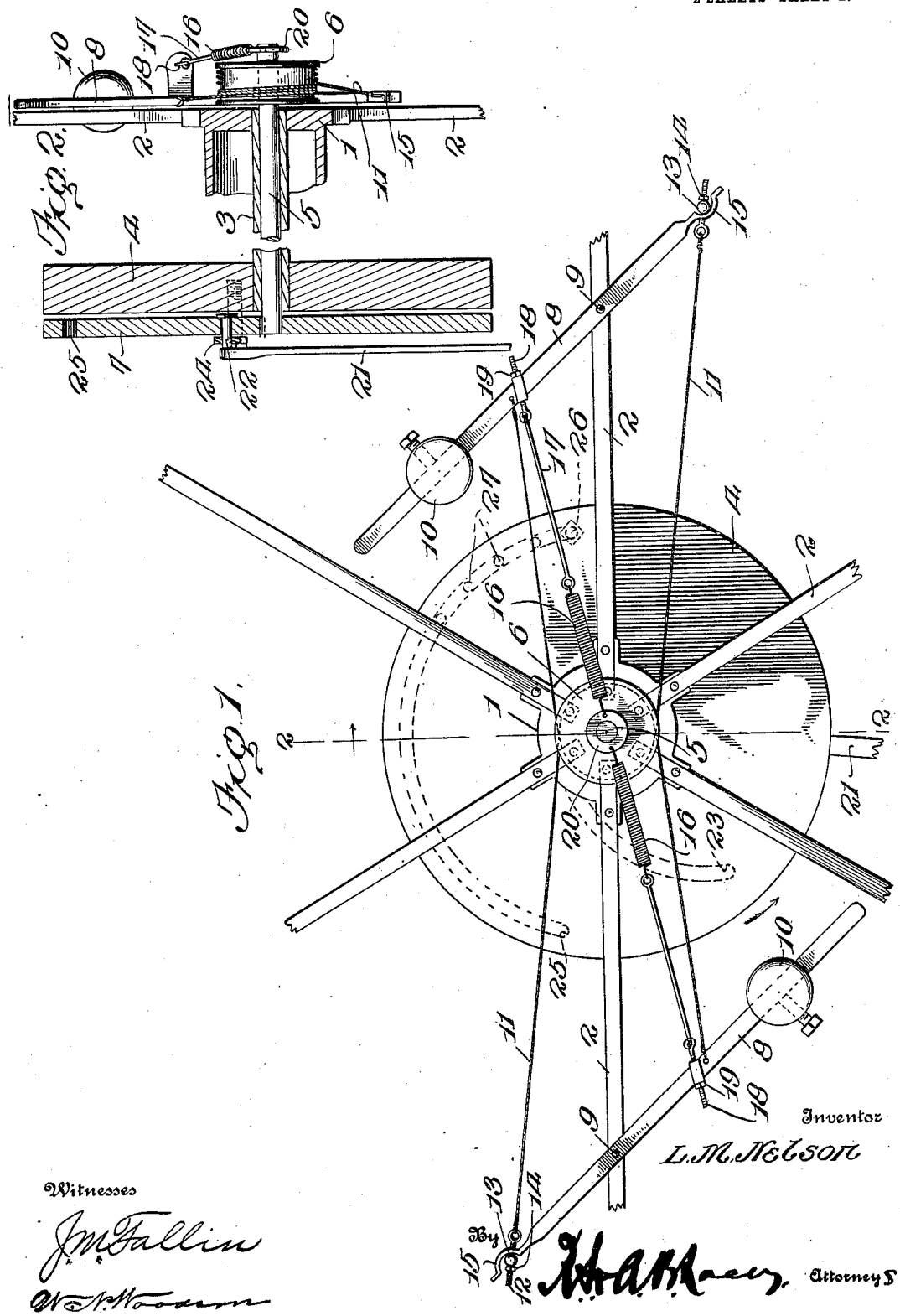

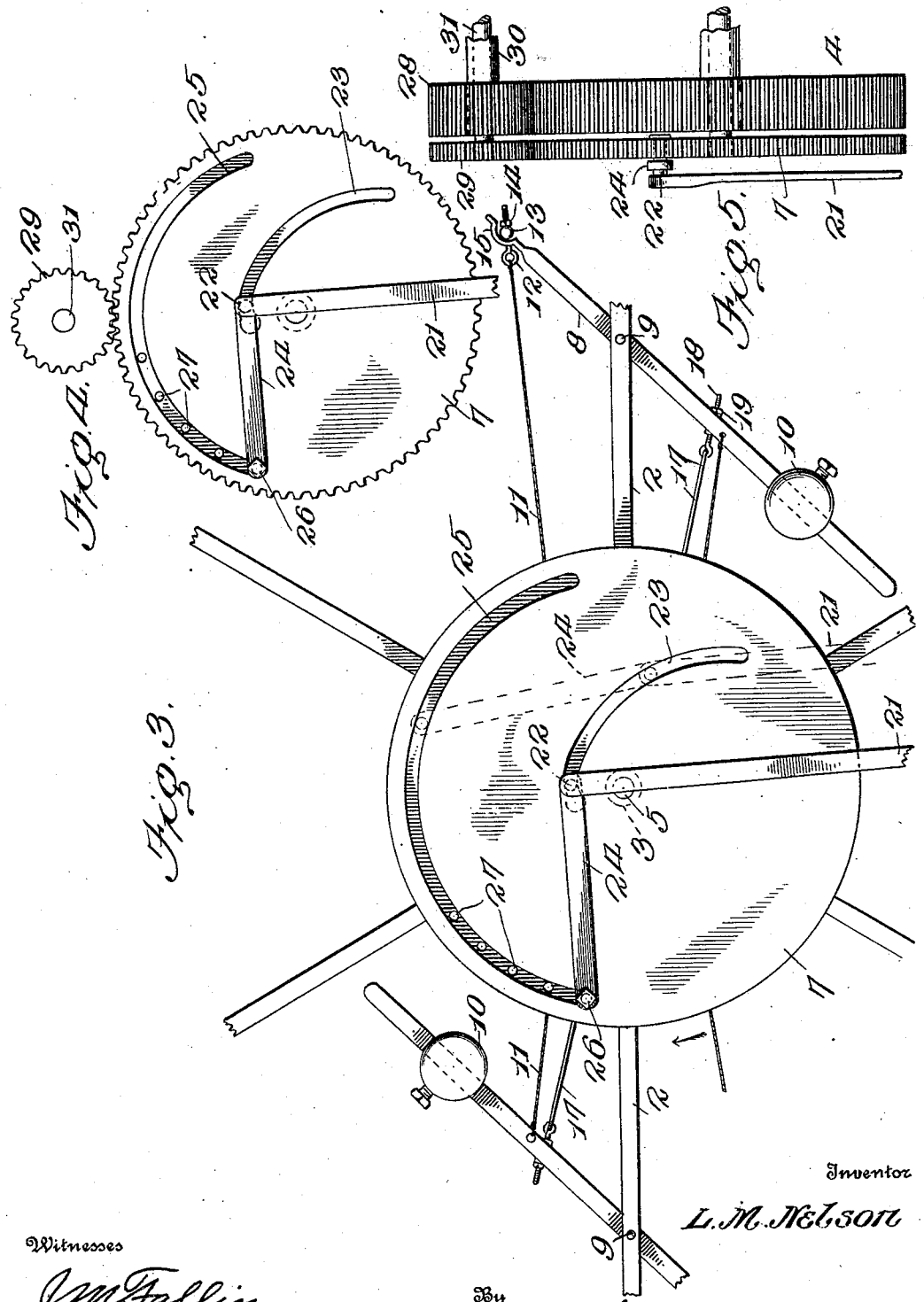

LOUIS M. NELSON, OF DOUGLAS, WYOMING.

WINDMILL-GOVERNOR.

934,689.  Specification of Letters Patent.  Patented Sept. 21, 1909.

Application filed February 16, 1909. Serial No. 478,206.

*To all whom it may concern:*

Be it known that I, LOUIS M. NELSON, a citizen of the United States, residing at Douglas, in the county of Converse and State of Wyoming, have invented certain new and useful Improvements in Windmill-Governors, of which the following is a specification.

The stroke of wind mills as ordinarily constructed remains uniform notwithstanding that the load is practically constant and the source of power, the air current, is variable. This construction frequently results in inactivity of the engine particularly when the force of the wind is light.

This invention has for its object to automatically vary the stroke of a wind mill, so that advantage may be taken of light winds to develop power and utilize the same for effective work, the leverage or length of stroke of the engine being diminished when the wind is traveling slowly and lengthened when the velocity of the air current increases.

In practicing the invention a governor mechanism embodying elements arranged in a novel and peculiar manner has been devised, the same comprising weighted governor arms acted upon in one direction by yielding means and movable in an opposite direction by centrifugal force, a drum adapted to be turned by the change of position of the governor arms, an actuating member connected with the drum and rotatable therewith and having a cam, and a crank pin movable by means of said cam toward and from the center of rotation or axis of the wind mill and having the pump rod or power transmission connected thereto.

For a full understanding of the invention and the merits thereof and also to acquire a knowledge of the details of construction and the means for effecting the result, reference is to be had to the following description and accompanying drawings, in which:

Figure 1 is a front view of a wind mill governor embodying the invention showing the same in an operative position; Fig. 2 is a section on the line 2—2 of Fig. 1 looking in the direction of the arrow; Fig. 3 is a view of the parts illustrated in Fig. 1, as seen from the rear; Fig. 4 is a similar view of a modification; and, Fig. 5 is an edge or side view of the parts shown in Fig. 4.

Corresponding and like parts are referred to in the following description and indicated in all the views of the drawings by the same reference characters.

The governor mechanism may be applied to any style of wind mill and in its application is illustrated in connection with a wind mill of the vertical type.

The wind wheel comprises a hub 1 and arms 2 radiating from the hub. The wind wheel shaft 3 is hollow and is connected with the hub 1, so as to rotate with the wheel. A disk 4 is fast to the shaft 3 and rotates therewith. A shaft 5 is mounted in the hollow shaft 3 and is provided at one end with a drum 6 and at its opposite end with an actuating member 7, both being connected to the shaft 5, so as to turn therewith in either direction. Governor arms 8 are pivotally mounted upon the arms of the wind wheel, the pivot points of said governor arms being indicated at 9. A weight 10 is adjustable upon one end of each governor arm. A cord or flexible connection 11 is attached at its ends to each of the governor arms upon opposite sides of its pivot support 9 and the intermediate portion is passed around the drum 6 any number of times to insure positive movement of said drum when movement is imparted to the governor arms. The flexible connection 11 is adapted to be lengthened or shortened to compensate for and prevent any looseness. As shown a threaded rod 12 is attached to one end of the part 11 and receives a cross bar 13 and a nut 14 and passes through a slot or opening in one end of the arm 8. The portion of the arm 8 having the slot or opening is depressed, as indicated at 15 to receive the cross bar 13 and thereby prevent slipping or disengagement of said cross bar from the arm.

A yieldable connection normally exerts a force upon each governor arm to hold its weighted end inward. The yieldable connection, as shown, comprises a contractile spring 16, a rod 17 and an adjustable connector consisting of a threaded rod 18 and a nut 19. A ring or washer 20 is mounted upon the outer end of the shaft 5 and the inner ends of the springs 16 are connected thereto. When the wind wheel or engine is in operation the governor arms rotate with the wind wheel and their weighted ends are acted upon by centrifugal force and are thrown outward against the tension of the springs 16 proportionate to the speed or degree of rotation of the wind wheel. Movement of the governor arms results in rotation of the drum 6 and the shaft 5 and actuating member 7 connected therewith.

The pump rod or power transmission 21 is connected to a crank pin 22 which coöperates with a cam 23 provided upon the actuating member 7. The cam 23 in the present instance is shown as a slot formed in the actuating member 7 which latter consists of a disk. The relative position of the crank pin 22 and cam 23 determines the distance of said crank pin from the center of rotation or axis of the wind wheel and the consequent length of stroke imparted to the pump rod or power transmission. A link 24 is connected at one end to the crank pin 22 and has adjustable connection at its opposite end with the disk 4. The purpose of the link 24 is to hold the crank pin in a relatively fixed position when moved to any point within the range of the cam 23. The connection between the outer end of the link 24 and the disk 4 may be effected in any manner. As indicated a curved slot 25 is formed in the actuating member 7 and a fastening 26 connecting the link 24 with the disk 4 passes through the curved slot 25. The fastening or connecting means or pin 26 is adapted to be adjustably connected with the disk 4 and for this purpose a series of openings 27 are formed in said disk concentric with the axis of the wind wheel, so as to register with the slot 25 which is struck from the center or axis of the wind wheel.

In the modification shown in Figs. 4 and 5 the disk 4 and actuating member 7 are toothed upon their outer edges and mesh with pinions 28 and 29 fast to shafts 30 and 31 corresponding respectively to the shafts 3 and 5 of the construction illustrated most clearly in Fig. 2. The shaft 31 is adapted to receive the governor controlled drum, whereas the shaft 30 has the wind wheel connected thereto. The toothed parts 4 and 7 in mesh with the pinions 28 and 29 are independently mounted, so as to be relatively turned, thereby admitting of the relative position of the crank pin 22 being varied to change the stroke of the pump rod or power transmission 21. The construction shown in the modification admits of the power transmitting gearing being located in a lower plane which is of advantage under certain conditions depending upon the particular design or structure of the wind mill.

It will be understood that the invention provides a governor mechanism wholly automatic in action for varying the stroke of the pump rod or power transmission thereby providing a wind mill which will operate effectively both in a light wind, as well as in a high wind, the leverage changing according to the variation in the velocity of the wind. When the parts are normally set the wind mill or engine will operate in an exceedingly light wind and as the force of the wind increases the leverage or stroke proportionately increases, this being due to the increased speed of the wind mill which causes the weighted ends of the governor arms 8 to fly outward and turn the drum 6 and the shaft 5 and actuating member 7 connected therewith, whereby the crank pin 22 is moved to a greater distance from the axis of the wind wheel, as indicated most clearly by the dotted lines in Fig. 3. When the force of the wind diminishes the speed of the wind wheel is lowered and the weighted ends of the governor arms 8 are pulled inward by the yielding connection to effect movement of the drum 6 in a reverse direction, thereby moving the part 7 in an opposite direction, so as to bring the crank pin 22 nearer the axis of the wind wheel with the result that the stroke is diminished and the wind wheel enabled to operate in a comparatively light breeze or air current of low velocity.

Having thus described the invention what is claimed as new is:

1. In governor mechanism of the character described the combination of a motor wheel, concentrically mounted members, a connection between the motor wheel, and one of said members, the other member having a cam slot and a second slot which latter is concentric with the axis of the members, a governor mechanism controlled by the speed of the motor wheel, a connection between said motor wheel and the member which is provided with the slots, power transmission, a crank pin having connection with the power transmission and mounted in said cam slot, a link connected at one end with said crank pin, and means connecting the opposite end of the link with the member having direct connection with the motor wheel and passed through the slot which is concentric with the axis of said members.

2. In combination, a motor wheel, a rotatable member, means connecting the rotatable member with the motor wheel for rotation therewith, a shaft concentric with said motor wheel and member, an actuating member fast to the shaft, and provided with a cam slot, power transmission, a crank pin having the power transmission connected thereto and adapted to be moved toward and from the axis of said members by means of said cam slot, a drum fast to said shaft, a governor arm mounted upon the motor wheel, connecting means between said governor arm and drum to effect a turning of the latter to change the position of the crank pin so as to vary the effective stroke of the power transmission according to the speed of the motor wheel.

3. In governor mechanism of the character described, the combination of coöperating members mounted concentrically, one of said members having a cam slot, power transmission, a crank pin controlled in its position by said cam slot to vary the effective stroke of the power transmission, a motor wheel, a connection between said motor wheel and the other member, a drum, a connection between said drum and the member which is provided with the cam slot, a governor arm mounted upon the motor wheel, and a flexible connection attached at its end to the governor arm upon opposite sides of its pivot support and having its intermediate portion passed about the drum.

4. In governor mechanism of the character described, the combination of coöperating members mounted concentrically, a motor wheel, a connection between said motor wheel and one of said members, the other member having a cam slot, power transmission, a crank pin controlled in its position by said cam slot to vary the effective stroke of the power transmission, a drum, a connection between said drum and the member provided with the cam slot, oppositely disposed governor arms mounted upon the governor wheel and flexible connections passed around said drum and having their end portions connected to the respective arms, upon opposite sides of their pivot supports.

5. In governor mechanism of the character described, a motor wheel, a rotatable member, means connecting the rotatable member with the motor wheel for the rotation of said member, an actuating member mounted concentric with the first named member and provided with a cam slot, a crank pin carried by one of said members and controlled in its position by said slot, governing means controlled by the speed of the motor wheel to effect the relative movement of said members so as to move the crank pin a greater or less distance from the center relative to the axis of said members, means connecting the governing means with the member which is provided with the slot, and means for varying the limits of movement of the crank pin in said slot.

6. In governing mechanism of the character described, the combination of a motor wheel, power transmission, a crank pin having connection with the power transmission, a member provided with a cam slot, the crank pin being mounted in said cam slot, a governing mechanism controlled by the speed of the motor wheel, a connection between said governing mechanism and said member, another member, a connection between the said last named member and the motor wheel, and a link connected at one end with said crank pin, and at its other end to said last named member.

7. In governing mechanism, of the character described, the combination of a motor wheel, concentrically mounted members, a direct connection between one of said members and the motor wheel, the other member having a cam slot and a slot concentric with the axis of said members, a governing mechanism which is controlled by the speed of the motor wheel, a connection between said governing mechanism and the member which is provided with the slots, power transmission, a crank pin having connection with said power transmission and mounted in said cam slot, a link connected at one end to said crank pin, and a pin connected to the other end of the link and received in the concentric slot and arranged for attachment at different points to the member which is directly connected to the motor wheel.

In testimony whereof I affix my signature in presence of two witnesses.

LOUIS M. NELSON. [L. S.]

Witnesses:
CHAS. C. TITUS,
H. I. HART.